(12) United States Patent
Masuda et al.

(10) Patent No.: US 10,097,564 B2
(45) Date of Patent: Oct. 9, 2018

(54) SERVICE PROVISION METHOD

(71) Applicant: Panasonic Intellectual Property Management Co., Ltd., Osaka (JP)

(72) Inventors: Kenji Masuda, Shiga (JP); Koji Nakamura, Osaka (JP); Takashi Yamaguchi, Osaka (JP)

(73) Assignee: PANASONIC IP MANAGEMENT CO., LTD., Osaka (JP)

( * ) Notice: Subject to any disclaimer, the term of this patent is extended or adjusted under 35 U.S.C. 154(b) by 259 days.

(21) Appl. No.: 15/023,677

(22) PCT Filed: Oct. 30, 2014

(86) PCT No.: PCT/JP2014/005482
§ 371 (c)(1),
(2) Date: Mar. 22, 2016

(87) PCT Pub. No.: WO2015/064101
PCT Pub. Date: May 7, 2015

(65) Prior Publication Data
US 2016/0212151 A1    Jul. 21, 2016

(30) Foreign Application Priority Data

Oct. 31, 2013  (JP) ................................. 2013-226906

(51) Int. Cl.
*H04L 29/06*    (2006.01)
*G06F 21/44*    (2013.01)

(52) U.S. Cl.
CPC ............ *H04L 63/126* (2013.01); *G06F 21/44* (2013.01); *H04L 63/08* (2013.01); *H04L 63/083* (2013.01)

(58) Field of Classification Search
CPC . H04L 63/126; H04L 9/00; H04L 9/32; A63F 9/24; G06K 9/00; G06F 15/16;
(Continued)

(56) References Cited

U.S. PATENT DOCUMENTS 6,262,497 B1 *  7/2001  Muroi .................... G04C 23/02
                                                          307/116
2005/0277405 A1 * 12/2005 Noguchi ............ H04N 1/00127
                                                          455/411
(Continued)

FOREIGN PATENT DOCUMENTS

JP     2002-064861     2/2002
JP     2006-074399     3/2006
(Continued)

OTHER PUBLICATIONS

International Search Report of PCT application No. PCT/JP2014/005482 dated Feb. 3, 2015.

*Primary Examiner* — Thanhnga B Truong
(74) *Attorney, Agent, or Firm* — Brinks Gilson & Lione

(57) ABSTRACT

A service providing method using a server that controls an electronic device from a terminal through a network, includes a first registration step of registering first path information indicating a connection relationship between the electronic device and a relay, and user information indicating an owner of the electronic device, which are transmitted from the terminal, in association with each other; a path acquisition step of acquiring second path information indicating a connection relationship between the electronic device and the relay, from service information transmitted from the electronic device; a service information acquisition step of acquiring service information that the electronic device holds; a comparison step of comparing the first path information with the second path information; and a providing step of providing the service information to the terminal, if the comparison result is inconsistent, in the comparison step.

11 Claims, 20 Drawing Sheets

(58) Field of Classification Search
CPC ......... G06F 21/00; G04C 23/00; G04C 23/02; H01H 43/00; H01H 43/02; H04M 1/66
USPC ..... 307/139, 116; 455/411, 410; 463/25, 29, 463/43; 713/182; 726/6–7
See application file for complete search history.

(56) References Cited

U.S. PATENT DOCUMENTS

2010/0062834 A1* 3/2010 Ryan ..................... G07F 17/32
463/25
2011/0302639 A1 12/2011 Matsuda et al.

FOREIGN PATENT DOCUMENTS

JP 2007-053639 3/2007
JP 2011-257858 12/2011

* cited by examiner

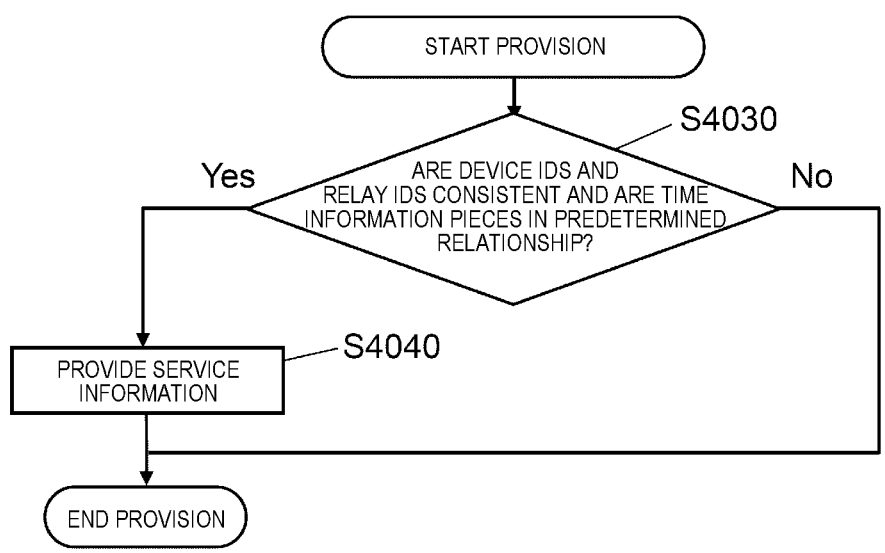

FIG. 9

| USER ID | PATH INFORMATION | |
| --- | --- | --- |
| | ELECTRONIC DEVICE | RELAY |
| 0001(USER A) | 192.168.229.10(ELECTRONIC DEVICE 400) | 192.168.229.1(RELAY 300) |
| 0002(USER B) | 192.168.229.11(ELECTRONIC DEVICE 410) | 192.168.229.2(RELAY 310) |
| 0002(USER B) | 192.168.229.12(ELECTRONIC DEVICE 420) | 192.168.229.2(RELAY 310) |
| 0002(USER B) | 192.168.229.13(ELECTRONIC DEVICE 430) | 192.168.229.3(RELAY 320) |

FIG. 10

| SENSOR INFORMATION | PATH INFORMATION | |
| --- | --- | --- |
| | ELECTRONIC DEVICE | RELAY |
| 3 | 192.168.229.10(ELECTRONIC DEVICE 400) | 192.168.229.1(RELAY 300) |

FIG. 11

| USER ID | PATH INFORMATION | |
| --- | --- | --- |
| | ELECTRONIC DEVICE | RELAY |
| 0001(USER A) | 192.168.229.10(ELECTRONIC DEVICE 400) | 192.168.229.1(RELAY 300) |
| 0002(USER B) | 192.168.229.11(ELECTRONIC DEVICE 410) | 192.168.229.2(RELAY 310) |
| 0002(USER B) | 192.168.229.12(ELECTRONIC DEVICE 420) | 192.168.229.2(RELAY 310) |
| 0002(USER B) | 192.168.229.13(ELECTRONIC DEVICE 430) | 192.168.229.3(RELAY 320) |
| 0001(USER A) | 192.168.229.12(ELECTRONIC DEVICE 420) | 192.168.229.1(RELAY 300) |

FIG. 12

| SENSOR INFORMATION | PATH INFORMATION | |
|---|---|---|
| | ELECTRONIC DEVICE | RELAY |
| 4 | 192.168.229.12(ELECTRONIC DEVICE 420) | 192.168.229.1(RELAY 300) |

FIG. 13

| USER ID | PATH INFORMATION | | TIME INFORMATION |
|---|---|---|---|
| | ELECTRONIC DEVICE(DEVICE ID) | RELAY(RELAY ID) | |
| 0001(USER A) | AC0001(ELECTRONIC DEVICE 400) | GW0001(RELAY 300) | T1 |
| 0002(USER B) | AC0002(ELECTRONIC DEVICE 410) | GW0002(RELAY 310) | T2 |
| 0002(USER B) | AC0003(ELECTRONIC DEVICE 420) | GW0002(RELAY 310) | T3 |
| 0002(USER B) | AC0004(ELECTRONIC DEVICE 430) | GW0003(RELAY 320) | T4 |

FIG. 14

| SENSOR INFORMATION | PATH INFORMATION | | TIME INFORMATION |
|---|---|---|---|
| | ELECTRONIC DEVICE(DEVICE ID) | RELAY(RELAY ID) | |
| 3 | AC0001(ELECTRONIC DEVICE 400) | GW0001(RELAY 300) | T5 |

FIG. 15

| USER ID | PATH INFORMATION | | TIME INFORMATION |
|---|---|---|---|
| | ELECTRONIC DEVICE(DEVICE ID) | RELAY(RELAY ID) | |
| 0001(USER A) | AC0001(ELECTRONIC DEVICE 400) | GW0001(RELAY 300) | T1 |
| 0002(USER B) | AC0002(ELECTRONIC DEVICE 410) | GW0002(RELAY 310) | T2 |
| 0002(USER B) | AC0004(ELECTRONIC DEVICE 430) | GW0003(RELAY 310) | T4 |
| 0001(USER A) | AC0003(ELECTRONIC DEVICE 420) | GW0002(RELAY 310) | T6 |

FIG. 16

| SENSOR INFORMATION | PATH INFORMATION | | TIME INFORMATION |
|---|---|---|---|
| | ELECTRONIC DEVICE(DEVICE ID) | RELAY(RELAY ID) | |
| 4 | AC0003(ELECTRONIC DEVICE 420) | GW0002(RELAY 310) | T7 |

FIG. 17

| USER ID | PATH INFORMATION | | PASS CODE |
|---|---|---|---|
| | ELECTRONIC DEVICE(DEVICE ID) | RELAY(RELAY ID) | |
| 0001(USER A) | AC0001(ELECTRONIC DEVICE 400) | GW0001(RELAY 300) | PASS1 |
| 0002(USER B) | AC0002(ELECTRONIC DEVICE 410) | GW0002(RELAY 310) | PASS2 |
| 0002(USER B) | AC0003(ELECTRONIC DEVICE 420) | GW0002(RELAY 310) | PASS3 |
| 0002(USER B) | AC0004(ELECTRONIC DEVICE 430) | GW0003(RELAY 320) | PASS4 |

FIG. 18

| SENSOR INFORMATION | PATH INFORMATION: DEVICE ID | RELAY ID | PASS CODE |
|---|---|---|---|
| 4 | AC0001(ELECTRONIC DEVICE 400) | GW0001(RELAY 300) | PASS1 |

FIG. 19

| USER ID | PATH INFORMATION | | PASS CODE |
| | ELECTRONIC DEVICE(DEVICE ID) | RELAY(RELAY ID) | |
|---|---|---|---|
| 0001(USER A) | AC0001(ELECTRONIC DEVICE 400) | GW0001(RELAY 300) | PASS1 |
| 0002(USER B) | AC0002(ELECTRONIC DEVICE 410) | GW0002(RELAY 310) | PASS2 |
| 0002(USER B) | AC0003(ELECTRONIC DEVICE 420) | GW0002(RELAY 310) | PASS3 |
| 0002(USER B) | AC0004(ELECTRONIC DEVICE 430) | GW0003(RELAY 320) | PASS4 |
| 0001(USER A) | AC0003(ELECTRONIC DEVICE 420) | GW0002(RELAY 310) | PASS5 |

FIG. 20

| SENSOR INFORMATION | PATH INFORMATION | | PASS CODE |
| | ELECTRONIC DEVICE(DEVICE ID) | RELAY(RELAY ID) | |
|---|---|---|---|
| 3 | AC0003(ELECTRONIC DEVICE 420) | GW0002(RELAY 310) | PASS5 |

FIG. 21

| USER ID | PATH INFORMATION | | TIME INFORMATION |
| --- | --- | --- | --- |
| | ELECTRONIC DEVICE | RELAY | |
| 0001(USER A) | 192.168.229.10(ELECTRONIC DEVICE 400) | 192.168.229.1(RELAY 300) | T1 |
| 0002(USER B) | 192.168.229.11(ELECTRONIC DEVICE 410) | 192.168.229.2(RELAY 310) | T2 |
| 0002(USER B) | 192.168.229.12(ELECTRONIC DEVICE 420) | 192.168.229.2(RELAY 310) | T3 |
| 0002(USER B) | 192.168.229.13(ELECTRONIC DEVICE 430) | 192.168.229.3(RELAY 320) | T4 |

FIG. 22

| SENSOR INFORMATION | PATH INFORMATION | | TIME INFORMATION |
| --- | --- | --- | --- |
| | ELECTRONIC DEVICE | RELAY | |
| 4 | 192.168.229.10(ELECTRONIC DEVICE 400) | 192.168.229.1(RELAY 300) | T5 |

FIG. 23

| USER ID | PATH INFORMATION | | TIME INFORMATION |
| --- | --- | --- | --- |
| | ELECTRONIC DEVICE | RELAY | |
| 0001(USER A) | 192.168.229.10(ELECTRONIC DEVICE 400) | 192.168.229.1(RELAY 300) | T1 |
| 0002(USER B) | 192.168.229.11(ELECTRONIC DEVICE 410) | 192.168.229.2(RELAY 310) | T2 |
| 0002(USER B) | 192.168.229.12(ELECTRONIC DEVICE 420) | 192.168.229.2(RELAY 310) | T3 |
| 0002(USER A) | 192.168.229.12(ELECTRONIC DEVICE 420) | 192.168.229.2(RELAY 310) | T10 |

FIG. 24

| SENSOR INFORMATION | PATH INFORMATION | | TIME INFORMATION |
|---|---|---|---|
| | ELECTRONIC DEVICE | RELAY | |
| 1 | 192.168.229.10(ELECTRONIC DEVICE 400) | 192.168.229.1(RELAY 300) | T6 |
| 2 | 192.168.229.11(ELECTRONIC DEVICE 410) | 192.168.229.2(RELAY 310) | T7 |
| 3 | 192.168.229.12(ELECTRONIC DEVICE 420) | 192.168.229.2(RELAY 310) | T8 |
| 0 | 192.168.229.13(ELECTRONIC DEVICE 430) | 192.168.229.3(RELAY 320) | T9 |
| 2 | 192.168.229.12(ELECTRONIC DEVICE 420) | 192.168.229.2(RELAY 310) | T11 |

FIG. 25

| SENSOR INFORMATION | PATH INFORMATION | | TIME | USER ID | SERVICE PROVISION PROPRIETY | USER ID | SERVICE PROVISION PROPRIETY |
|---|---|---|---|---|---|---|---|
| | ELECTRONIC DEVICE | RELAY | | | | | |
| 1 | 192.168.229.10 (ELECTRONIC DEVICE 400) | 192.168.229.1 (RELAY 300) | T6 | 0001 | 1 | 0002 | 0 |
| 2 | 192.168.229.11 (ELECTRONIC DEVICE 410) | 192.168.229.2 (RELAY 310) | T7 | 0001 | 0 | 0002 | 1 |
| 3 | 192.168.229.12 (ELECTRONIC DEVICE 420) | 192.168.229.2 (RELAY 310) | T8 | 0001 | 0 | 0002 | 1 |
| 0 | 192.168.229.13 (ELECTRONIC DEVICE 430) | 192.168.229.3 (RELAY 320) | T9 | 0001 | 0 | 0002 | 1 |
| 2 | 192.168.229.12 (ELECTRONIC DEVICE 420) | 192.168.229.2 (RELAY 310) | T11 | 0001 | 1 | 0002 | 0 |

FIG. 26

| USER ID | PATH INFORMATION | | PASS CODE |
| --- | --- | --- | --- |
| | ELECTRONIC DEVICE | RELAY | |
| 0001(USER A) | 192.168.229.10(ELECTRONIC DEVICE 400) | 192.168.229.1(RELAY 300) | PASS1 |
| 0002(USER B) | 192.168.229.11(ELECTRONIC DEVICE 410) | 192.168.229.2(RELAY 310) | PASS2 |
| 0002(USER B) | 192.168.229.12(ELECTRONIC DEVICE 420) | 192.168.229.2(RELAY 310) | PASS3 |
| 0002(USER B) | 192.168.229.13(ELECTRONIC DEVICE 430) | 192.168.229.3(RELAY 320) | PASS4 |

FIG. 27

| SENSOR INFORMATION | PATH INFORMATION | | PASS CODE |
| --- | --- | --- | --- |
| | ELECTRONIC DEVICE | RELAY | |
| 4 | 192.168.229.10(ELECTRONIC DEVICE 400) | 192.168.229.1(RELAY 300) | PASS1 |

FIG. 28

| USER ID | PATH INFORMATION | | PASS CODE |
| --- | --- | --- | --- |
| | ELECTRONIC DEVICE | RELAY | |
| 0001(USER A) | 192.168.229.10(ELECTRONIC DEVICE 400) | 192.168.229.1(RELAY 300) | PASS1 |
| 0002(USER B) | 192.168.229.11(ELECTRONIC DEVICE 410) | 192.168.229.2(RELAY 310) | PASS2 |
| 0002(USER B) | 192.168.229.12(ELECTRONIC DEVICE 420) | 192.168.229.2(RELAY 310) | PASS2 |
| 0002(USER B) | 192.168.229.13(ELECTRONIC DEVICE 430) | 192.168.229.3(RELAY 320) | PASS3 |
| 0002(USER A) | 192.168.229.12(ELECTRONIC DEVICE 420) | 192.168.229.3(RELAY 310) | PASS5 |

FIG. 29

| SENSOR INFORMATION | PATH INFORMATION | | PASS CODE |
| --- | --- | --- | --- |
| | ELECTRONIC DEVICE | RELAY | |
| 1 | 192.168.229.10(ELECTRONIC DEVICE 400) | 192.168.229.1(RELAY 300) | PASS1 |
| 4 | 192.168.229.11(ELECTRONIC DEVICE 410) | 192.168.229.2(RELAY 310) | PASS2 |
| 3 | 192.168.229.12(ELECTRONIC DEVICE 420) | 192.168.229.2(RELAY 310) | PASS2 |
| 2 | 192.168.229.13(ELECTRONIC DEVICE 430) | 192.168.229.3(RELAY 320) | PASS3 |
| 0 | 192.168.229.12(ELECTRONIC DEVICE 420) | 192.168.229.3(RELAY 310) | PASS5 |

FIG. 30

| SENSOR INFORMATION | PATH INFORMATION | | PASS CODE | USER ID | SERVICE PROVISION PROPRIETY | USER ID | SERVICE PROVISION PROPRIETY |
| --- | --- | --- | --- | --- | --- | --- | --- |
| | ELECTRONIC DEVICE | RELAY | | | | | |
| 1 | 192.168.229.10 (ELECTRONIC DEVICE 400) | 192.168.229.1 (RELAY 300) | PASS1 | 0001 | 1 | 0002 | 0 |
| 4 | 192.168.229.11 (ELECTRONIC DEVICE 410) | 192.168.229.2 (RELAY 310) | PASS2 | 0001 | 0 | 0002 | 1 |
| 3 | 192.168.229.12 (ELECTRONIC DEVICE 420) | 192.168.229.2 (RELAY 310) | PASS2 | 0001 | 0 | 0002 | 1 |
| 2 | 192.168.229.13 (ELECTRONIC DEVICE 430) | 192.168.229.3 (RELAY 320) | PASS3 | 0001 | 0 | 0002 | 1 |
| 0 | 192.168.229.12 (ELECTRONIC DEVICE 420) | 192.168.229.2 (RELAY 310) | PASS5 | 0001 | 1 | 0002 | 0 |

# SERVICE PROVISION METHOD

TECHNICAL FIELD

The present invention relates to a service providing method for providing a user with information acquired from an electronic device.

BACKGROUND ART

PTL 1 has proposed a personal authentication system that authenticates a user, based on whether or not input data for user authentication and pre-registered data are consistent with each other and a moving distance determined based on a current position and a current time, and determines whether to display information.

In this personal authentication system, predetermined registration data for the user, and the position and date and time when a mobile terminal device was used in the past are stored in a storage device in association with each other. If user data which is input to the mobile terminal device and current position data of the mobile terminal device are received, it is determined whether or not a first authentication condition is satisfied, in which the user data input to the mobile terminal device is consistent with predetermined registered data. In addition, it is determined whether or not a second authentication condition is satisfied, in which a distance between the position at the time of use in the past being stored in the storage device and the present position of the mobile terminal device is a movable distance within a time difference between the date and time of use in the past being stored in the storage device and the present date and time. Then, if at least the first authentication condition and the second authentication condition are satisfied, the personal authentication is completed.

Accordingly, it is possible to perform personal authentication of the user of the mobile terminal device with a relatively simple structure, using the current position and the current time of the mobile terminal device.

PTL 1 discloses a personal authentication system that determines the user is the owner, based on a distance between the current position information and the past position information of the mobile communication device. However, there is no disclosure about handling the information after the authentication. Thus, for example, there is a problem that when the owner of the mobile communication device is changed, the information from after the change which is accumulated after the change and the information from before the change which is accumulated before the change (unnecessary information for the owner after the change) are mixed and provided to the owner after the change.

CITATION LIST

Patent Literature

PTL 1: Japanese Patent Unexamined Publication No. 2002-64861

SUMMARY OF INVENTION

The present invention is made to solve the above problem in the related art, and an object is to provide a service providing method which prevents the service information that is acquired before the change from being provided to the owner after the change, and prevents the service information that is acquired after the change from being provided to a third party including the owner before the change, when the owner of the electronic device changes.

A service providing method of the present invention includes a first registration step of registering first path information indicating a connection relationship between the electronic device and a relay which relays communication with the electronic device, and user information indicating an owner of the electronic device, which are transmitted from the terminal, in association with each other. The service providing method includes a path acquisition step of acquiring second path information indicating a connection relationship between the electronic device and the relay, from service information transmitted from the electronic device. The service providing method includes a service information acquisition step of acquiring service information that the electronic device holds, and a comparison step of comparing the first path information that is registered in the first registration step with the second path information that is acquired in the path acquisition step. The service providing method includes a providing step of providing the service information to the terminal, if a comparison result in the comparison step is consistent.

According to the service providing method of the present invention, the path information that is registered by the user and the path information when the service information is acquired are compared with each other. Thus, when the owner of the electronic device changes, it is possible to prevent the service information that is acquired and accumulated from the electronic device before the owner is changed, in other words, the service information that is unnecessary for the owner after the change from being provided to the owner after the change. Further, it is possible to prevent the information that is acquired and accumulated from the electronic device after the owner is changed from being provided to a third party including the owner before the change.

BRIEF DESCRIPTION OF DRAWINGS

FIG. 4C is a flowchart illustrating the operation of the server to provide service information, in Exemplary Embodiment 2.

FIG. 9 is a diagram illustrating a user ID and path information which are registered, in Exemplary Embodiment 1.

FIG. 10 is a diagram illustrating the acquired service information, in Exemplary Embodiment 1.

FIG. 11 is a diagram illustrating user ID and path information, which are registered after the owner is changed, in Exemplary Embodiment 1.

FIG. 12 is a diagram illustrating the service information acquired after the owner is changed in Exemplary Embodiment 1.

FIG. 13 is a diagram illustrating the user ID, the path information, and the time information, which are registered, in Exemplary Embodiment 2.

FIG. 14 is a diagram illustrating the acquired service information, in Exemplary Embodiment 2.

FIG. 15 is a diagram illustrating a user ID, path information, and time information, which are registered after the owner is changed, in Exemplary Embodiment 2.

FIG. 16 is a diagram illustrating service information acquired after the owner is changed in Exemplary Embodiment 2.

FIG. 17 is a diagram illustrating a user ID, path information, and a pass code, which are registered, in Exemplary Embodiment 3.

FIG. 18 is a diagram illustrating service information and a pass code which are received and acquired from the electronic device by the server in Exemplary Embodiment 3.

FIG. 19 is a diagram illustrating a user ID, path information, and a pass code, which are registered after the owner is changed, in Exemplary Embodiment 3.

FIG. 20 is a diagram illustrating the service information and a pass code which are registered after the owner is changed in Exemplary Embodiment 3.

FIG. 21 is a diagram illustrating a user ID, path information, and time information, which are registered, in Exemplary Embodiment 4.

FIG. 22 is a diagram illustrating the acquired service information, in Exemplary Embodiment 4.

FIG. 23 is a diagram illustrating a user ID, path information, and time information, which are registered after the owner is changed, in Exemplary Embodiment 4.

FIG. 24 is a diagram illustrating service information acquired before and after the owner is changed, in Exemplary Embodiment 4.

FIG. 25 is a diagram illustrating each piece of sensor information for each user and the propriety of provision of the sensor information for each user, in Exemplary Embodiment 4.

FIG. 26 is a diagram illustrating a user ID, path information, and a pass code, which are registered, in Exemplary Embodiment 5.

FIG. 27 is a diagram illustrating service information and a pass code which are received and acquired from an electronic device by the server in Exemplary Embodiment 5.

FIG. 28 is a diagram illustrating a user ID, path information, and a pass code, which are registered after the owner is changed, in Exemplary Embodiment 5.

FIG. 29 is a diagram illustrating service information and a pass code, which are acquired before and after the owner is changed, in Exemplary Embodiment 5.

FIG. 30 is a diagram illustrating sensor information for each user and the propriety of provision of the sensor information for each user, in Exemplary Embodiment 5.

DESCRIPTION OF EMBODIMENTS

Hereinafter, exemplary embodiments of the present invention will be described with reference to the drawings. Incidentally, it is not intended that the invention is limited by the exemplary embodiments.

(Exemplary Embodiment 1)

Figure 1:
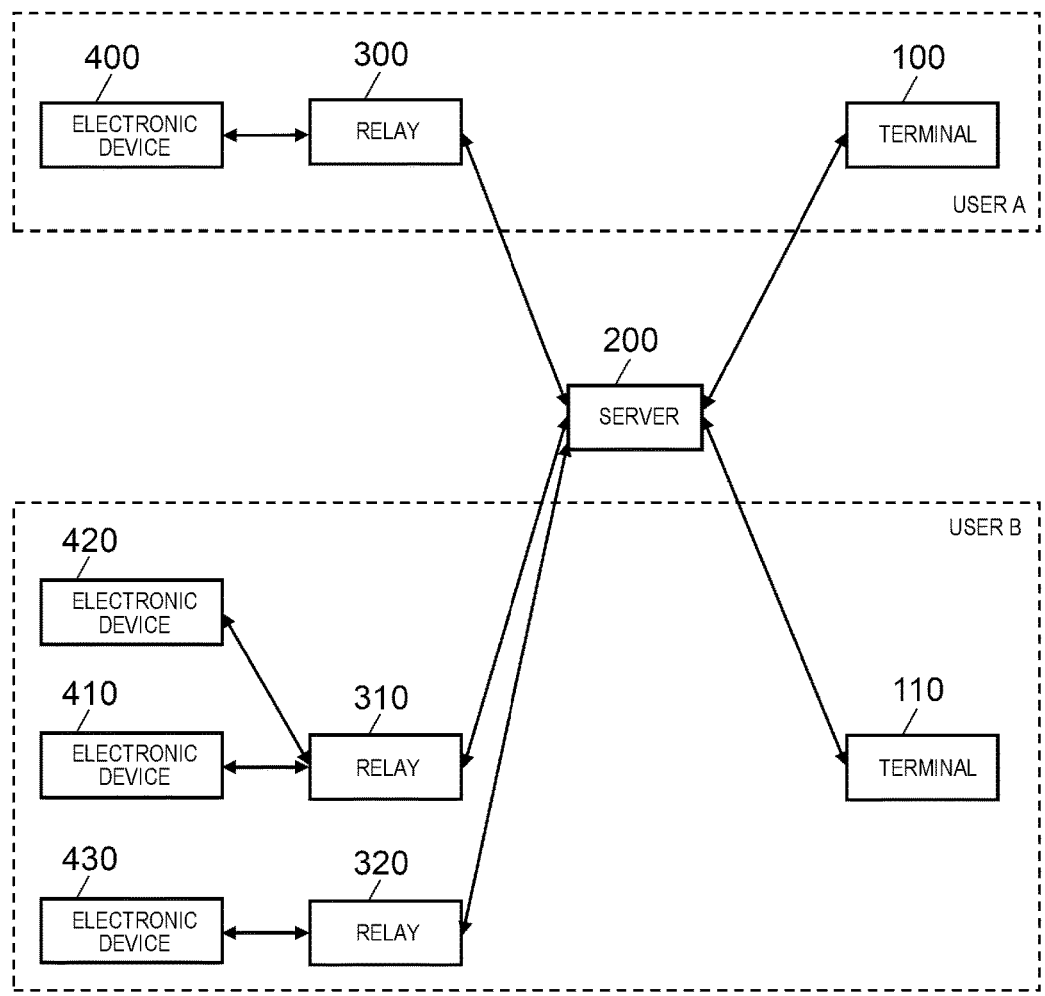
FIG. 1 is a configuration diagram illustrating an entire system according to the present invention.

FIG. 1 is a configuration diagram illustrating an entire system according to the present invention. The system includes terminals 100, and 110, server 200, relays 300, 310, and 320, and electronic devices 400, 410, 420, and 430.

Terminal 100 is, for example, a mobile phone, a smartphone, a personal computer, or the like. Terminal 100 is capable of obtaining (downloading) an application program from the outside. The processes by terminal 100 and terminal 110 described below are executed by the application program. Terminal 110 also has the same configuration, and performs the same operations as those of terminal 100.

Server 200 is connected to terminal 100 through a public line. Server 200 processes and stores various signals transmitted from terminal 100, and transmits these signals to relay 300. Similarly, server 200 is connected to terminal 110 through a public line. Server 200 processes and stores various signals transmitted from terminal 110, and transmits these signals to relay 310 and relay 320.

Relay 300 relays the various signals transmitted from server 200 to electronic device 400, and relays various signals transmitted from electronic device 400 to server 200, through the Internet. Similarly, relays 310 and 320 relay the various signals transmitted from server 200 to electronic devices 410, 420, and 430, and relay various signals transmitted from electronic devices 410, 420, and 430 to server 200, through the Internet.

Electronic device 400 is, for example, a device that is appropriately selected from a TV, a recorder, an air conditioner, a vacuum cleaner, a refrigerator, a washing machine, a rice cooker, a microwave oven, and a water heater. Electronic device 400 is often placed in the home of the user of electronic device 400, but may be placed outside the home of the user. In addition, electronic device 400 is equipped with a communication function unit capable of implementing wireless communication with relay 300. The communication function unit may be made of a separate device other than electronic device 400, and configured to be connected to electronic device 400. In addition, electronic device 400 is equipped with a sensor, and can transmit sensor information as service information. In addition, the sensor, for example, is a human sensor, and transmits the reaction number of times of the sensor as the sensor information. There are five stages, for example, "0" (low) to "4" (many) for the reaction number of times. Here, the human sensor is used for the sensor, but without being limited thereto, a different sensor such as a temperature sensor or a humidity sensor may be used.

Incidentally, the service information may be an internal processing value of electronic device 400. The internal processing value means any value that is processed by electronic device 400. For example, the internal processing value is information related to the operation of electronic device 400, and more specifically, information regarding power consumption, a total operating time from the time of purchase, total power consumption information from the time of purchase, or the like. More specifically, if electronic device 400 is a refrigerator, the internal processing value is door opening and closing count information, a drive time of the compressor, dehumidifying operation information, or the like. In addition, if electronic device 400 is an air conditioner, the internal processing value is indoor temperature, outdoor temperature information, humidity information, a set temperature change transition during operation, or the like.

Electronic devices 410, 420, and 430 have the same structure and function as electronic device 400.

Wireless communication between relays 300, 310, and 320 and electronic devices 400, 410, 420, and 430 is implemented by wireless LAN, Bluetooth (trademark), and various communication means (communication standard) that are appropriately selected from specified low power radio.

Relays 300, 310, and 320 can also be connected to any of electronic devices 400, 410, 420, and 430. Here, terminal 100, relay 300, and electronic device 400 are owned by user A. Relay 300 is connected to electronic device 400. Terminal 110, relays 310 and 320, and electronic devices 410, 420, and 430 are owned by user B. Relay 310 is connected to electronic devices 410 and 420, and relay 320 is connected to electronic device 430.

Figure 2A:
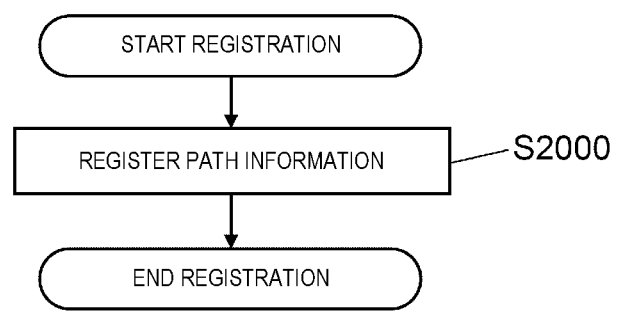
FIG. 2A is a flowchart illustrating the operation of a server to register a user ID and path information, in Exemplary Embodiment 1.

FIG. 2A is a flowchart illustrating the operation of the server to register a user ID and path information in Exemplary Embodiment 1.

First, the operation of a service registration step will be described in the case of registering relay 300 and electronic device 400 that user A owns.

Server 200 receives path information indicating the connection of electronic device 400 to relay 300, and a user ID for specifying user A from terminal 100, and registers the path information and the user ID in association with each other (step S2000).

The user ID is a user-specific number, and is intended to define the user uniquely. Terminal 100 receives an input for specifying a user ID which is a user A-specific number.

Path information is, specifically, for example, data with the IP address of electronic device 400 and the IP address of relay 300 as a pair. A path that is connected from server 200 to electronic device 400 through relay 300 is specified by the path information. Terminal 100 receives inputs performed by user A, respectively specifying the IP address of electronic device 400 and the IP address of relay 300.

In addition, here, each of electronic device 400 and relay 300 is identified by the IP address, but for example, may be identified by the device ID (a product number or a serial number), or may be identified by the MAC address, or the like. The same is also applied to another exemplary embodiment, in which each of electronic device 400 and relay 300 may be identified by the IP address, may be identified by the device ID (a product number or a serial number), or may be identified by the MAC address, or the like.

Similarly, server 200 registers path information on the connection relationship between relay 310 and each of electronic devices 410, and 420, and a user ID for identifying user B, which are received from the terminal 110. In addition, server 200 registers path information on the connection relationship between relay 320 and electronic device 430, and a user ID for identifying user B, which are received from terminal 110.

FIG. 9 illustrates the user ID and the path information which are registered, in Exemplary Embodiment 1. Here, the user ID and the path information are registered in association with each other.

Figure 2B:
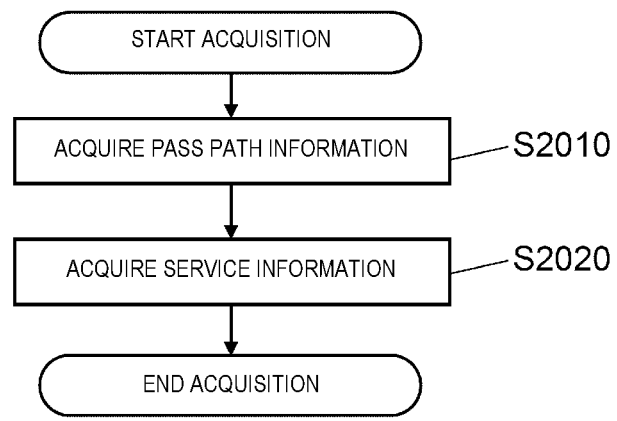
FIG. 2B is a flowchart illustrating the operation of the server to acquire service information, in Exemplary Embodiment 1.

FIG. 2B is a flowchart illustrating the operation of server 200 to acquire service information in Exemplary Embodiment 1.

The operation of the service information acquisition step will be described as the case where server 200 acquires the service information from electronic device 400.

If receiving the service information, server 200 extracts a path through which the service information has been transmitted.

The service information is the sensor information of electronic device 400, and is transmitted from electronic device 400 to server 200 through relay 300. The IP addresses of electronic device 400 and relay 300 that indicate the relay path are added to the sensor information that server 200 has received.

The service information that is acquired in Exemplary Embodiment 1 is illustrated in FIG. 10. Here, the service information includes the sensor information, and the path information.

When receiving the service information, the server 200 acquires the path information through which the service information has been transmitted, by extracting the IP addresses of electronic device 400 and relay 300 (step S2010).

Server 200 extracts the sensor information that is transmitted by electronic device 400, from the received service information (step S2020). The same flow is also applied when acquiring the service information from electronic devices 410, 420, and 430.

The operation of the service information providing step will be described as the case where server 200 acquires the service information from electronic device 400.

Figure 2C:
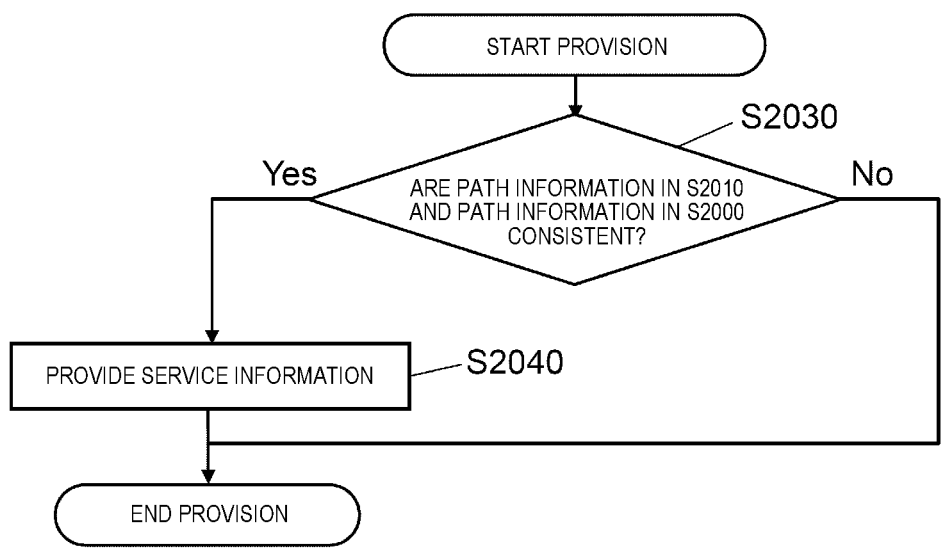
FIG. 2C is a flowchart illustrating the operation of the server to provide the service information, in Exemplary Embodiment 1.

FIG. 2C is a flowchart illustrating the operation of the server to provide service information in Exemplary Embodiment 1.

When receiving the user ID for identifying user A and a request for sensor information viewing of electronic device 400, from terminal 100, server 200 compares the path information acquired in step S2010 with the path information that user A registers in step S2000 (step S2030).

In other words, in step S2030, the path information acquired in step S2010 is compared with the path information that user registered in step S2000.

Server 200 transmits sensor information, for which the path information pieces, in other words, the combinations of the IP address of the electronic device and the IP address of the relay are consistent with each other, as a result of the comparison, to terminal 100 (step S2040). Meanwhile, server 200 does not transmit the sensor information, for which path information pieces are not consistent with each other, to the terminal 100, as a result of the comparison.

Here, it is assumed that the registration of path information and the request for the sensor information viewing are executed by the same terminal 100, however, these do not necessarily need to be executed by the same terminal; and if the user IDs are the same, the registration and the request may be executed by different terminals.

The same flow is also applied when user B views service information acquired from electronic device 410, or views service information acquired from electronic device 420, using terminal 110.

Here, for example, it is assumed that the owner of electronic device 420 is changed from user B to user A. FIG. 11 illustrates the user ID and path information, which are registered after the owner is changed, in Exemplary Embodiment 1.

User A newly registers path information pieces of electronic device 420 and relay 300, in the procedure indicated by step S2000. In this case, the registered combination of the path information pieces of electronic device 420 and relay 310 is not necessarily deleted by user B.

Figure 3:
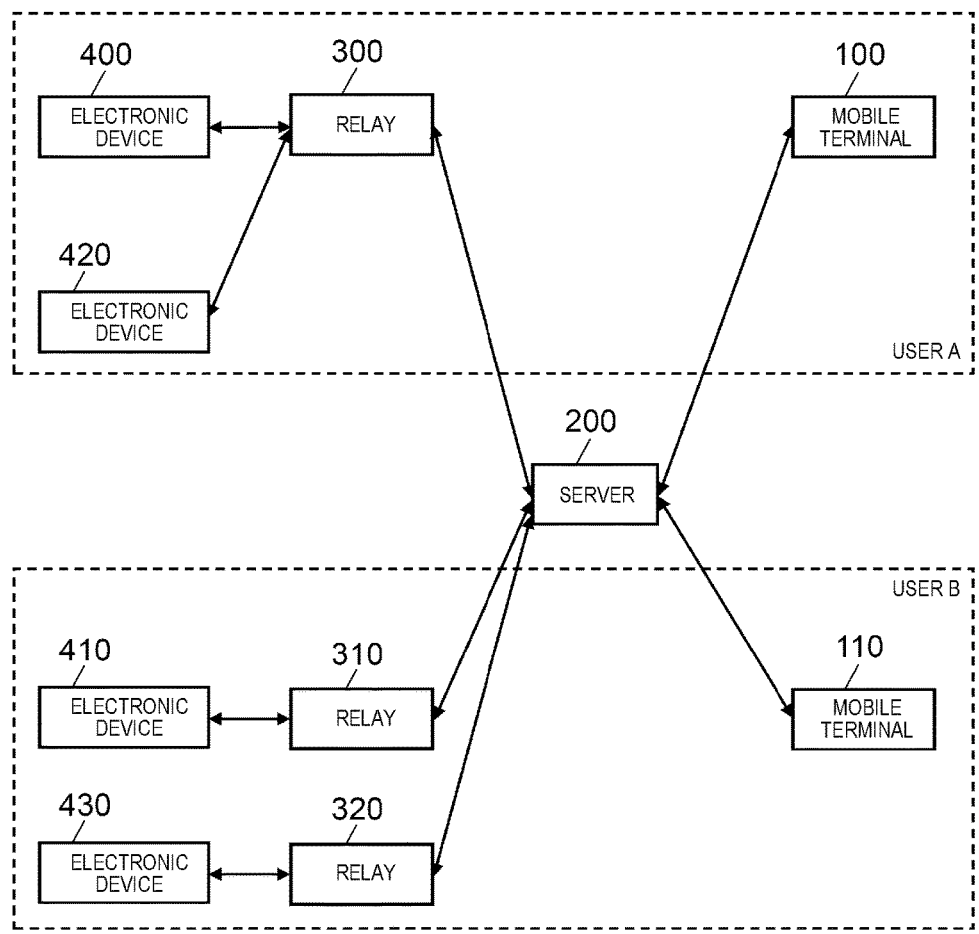
FIG. 3 is a configuration diagram illustrating the entire system after the owner of an electronic device is changed from user B to user A, in Exemplary Embodiment 1.

FIG. 3 illustrates the overall configuration of the system after the owner of electronic device 420 is changed from user B to user A in Exemplary Embodiment 1.

Thereafter, server 200 acquires the service information of electronic device 420, according to the flows of step S2010 and step S2020. FIG. 12 illustrates the service information acquired after the owner is changed in Exemplary Embodiment 1.

Thereafter, it is assumed that server 200 receives the user ID for identifying user A and a request for sensor information viewing of electronic device 420, from terminal 100. Server 200 compares the path information (FIG. 11) registered in step S2000 with the path information (FIG. 12) acquired in step S2010 (step S2030), and transmits sensor information for which the path information pieces are consistent with each other, to terminal 100 (step S2040).

Meanwhile, it is assumed that server 200 receives the user ID for identifying user B and a request for sensor information viewing of electronic device 420 from terminal 110. The combination of the IP address of electronic device 420 and the IP address of relay 310, in other words, the path information from before the change of the owner of electronic device 420 is registered as the path information of user B. In contrast, the sensor information that the server 200 has received after the owner is changed is acquired together with the combination of the IP address of electronic device 420 and the IP address of relay 300. Accordingly, server 200 determines that the path information pieces are not consistent with each other (step S2030), and does not transmit the sensor information illustrated in FIG. 12 to terminal 110 of user B.

Further, it is assumed that server 200 receives the user ID for identifying user A from terminal 100 and a request for sensor information viewing of electronic device 410. Server 200 does not have the path information associated with electronic device 410, which is registered together with the user ID for identifying user A. Accordingly, server 200 does not transmit the sensor information to terminal 100.

Further, it is assumed that server 200 receives the user ID for identifying user B and a request for sensor information viewing of electronic device 400, from terminal 110. Server 200 does not have the path information associated with electronic device 400, which is registered together with the user ID for identifying user B. Accordingly, server 200 does not transmit the sensor information to terminal 110.

As described above, according to Exemplary Embodiment 1, server 200 is capable of extracting the service information acquired through path matching the registered path information, and providing the service information to terminal 100 or 110. Thus, when the owner of the electronic device is changed, it is possible to prevent unnecessary service information from before the change from being provided to the owner after the change. In addition, after the owner is changed, it is possible to prevent unnecessary service information from after the change from being provided to the owner before the change. In addition, it is difficult for a third party to register the electronic device along with the path information of the relay, without the permission of the owner. Therefore, it is possible to prevent unnecessary service information from being provided to a third party without the permission of the owner.

(Exemplary Embodiment 2)

Figure 4A:
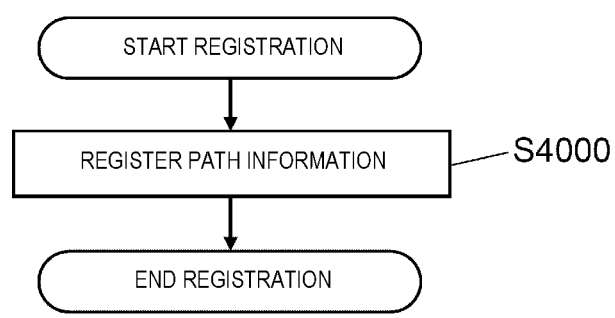
FIG. 4A is a flowchart illustrating the operation of a server to register a user ID and path information, in Exemplary Embodiment 2.

FIG. 4A is a flowchart illustrating the operation of the server to register a user ID and path information in Exemplary Embodiment 2. The configuration of the system is the same as in Exemplary Embodiment 1 (FIG. 1). With respect to the same steps as in Exemplary Embodiment 1, descriptions thereof will be omitted.

First, the operation of the registration step of service will be described in the case of registering relay 300 and electronic device 400 that user A owns.

Server 200 receives a device ID of electronic device 400, a relay ID of relay 300, and a user ID for specifying user A from terminal 100, and registers the device ID and the relay ID in association with time information (T1) about the reception time of server 200 (step S4000).

Here, the device ID is a unique number for identifying electronic device 400, and the relay ID is a unique number for identifying the relay 300.

Similarly, server 200 receives path information indicating the connection of electronic devices 410, and 420 to relay 310, and the user ID for identifying user B from terminal 110, and registers the path information and the user ID in association with the received time information (T2, T3). Further, server 200 receives path information indicating the connection of relay 320 to electronic device 430, and the user ID for identifying user B from terminal 110, and registers the path information and the user ID in association with the received time information (T4). The time information pieces when electronic devices 410, 420, and 430 are registered are respectively assumed as T2, T3, and T4.

In addition, in Exemplary Embodiment 2, the time information is assumed as time when the server receives information, but may be assumed as time when information is transmitted from electronic device 400 or relay 300, or may be assumed as time when server 200 registers information. The same is applied to other exemplary embodiments, and the time information may be assumed as time when the server receives information, may be assumed as time when information is transmitted from the electronic device or the relay, or may be assumed as time when the server registers information.

FIG. 13 illustrates the registered user ID, the path information, and the time information, in Exemplary Embodiment 2.

Figure 4B:
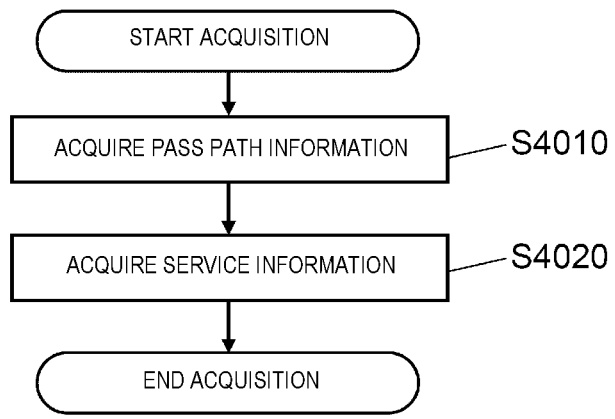
FIG. 4B is a flowchart illustrating the operation of the server to acquire service information, in Exemplary Embodiment 2.

FIG. 4B is a flowchart illustrating the operation of the server to acquire service information in Exemplary Embodiment 2.

The operation in the service information acquisition step will be described as the case where server 200 acquires the service information from electronic device 400.

If receiving the service information, server 200 extracts a path through which the service information has been transmitted.

The service information is the sensor information of electronic device 400, and is transmitted from electronic device 400 to server 200 through relay 300. The device ID of electronic device 400 and the relay ID of relay 300, which indicate a relay path, are added to the sensor information that server 200 has received.

FIG. 14 illustrates the acquired service information, in Exemplary Embodiment 2. Here, the service information includes sensor information, path information, and time information.

If receiving the service information, server 200 extracts the device ID of electronic device 400 and the relay ID of relay 300 so as to acquire information on a path through which the service information has been transmitted (step S4010).

Server 200 extracts the sensor information that electronic device 400 has transmitted, from the received service information. At this time, the device ID, the relay ID, and the sensor information, which are acquired in step S4010, are associated with time information (T5) when server 200 receives information (step S4020).

The same flow is also applied to the case of acquiring the service information from electronic devices 410, 420, and 430.

Next, the operation of the service information providing step will be described.

FIG. 4C is a flowchart illustrating the operation of the server to provide service information in Exemplary Embodiment 2.

When receiving the user ID for identifying user A and a request for sensor information viewing of electronic device 400 from terminal 100, server 200 compares the set information of the device ID and the relay ID, acquired in step S4010, with the set information of the device ID and the relay ID that user A registers in step S4000. In addition, server 200 compares the time information (T5) when receiving the sensor information acquired in step S4020 with the time information (T1) registered in step S4000 (step S4030).

In other words, it is determined in step S4030 whether or not the device ID acquired in S4010 is consistent with the device ID that the user registers in step S4000. Further, it is determined in step S4030 whether or not the relay ID acquired in S4010 is consistent with the device ID that the user registers in step S4000. Further, the time information (T5) when receiving the sensor information acquired in step S4020 is compared with the time information (T1) registered in step S4000, in step S4030.

As a comparison result, if the path information pieces, in other words, the set information pieces of the device ID and the relay ID are consistent with each other, and T5 is later than T1, server 200 transmits the sensor information associated with the set information to terminal 100 (step S4040). If the path information pieces are not consistent with each other, or if the path information pieces are consistent with each other, but T5 is earlier than T1, server 200 does not transmit the sensor information to terminal 100.

The same flow is applied to the case where user B views the service information acquired from electronic device 410 and the case where user B views the service information acquired from electronic device 420, using terminal 110.

Here, for example, it is assumed that the owner of electronic device 420 and relay 310 is changed from user B to user A. FIG. 15 illustrates a user ID, path information, and time information, which are registered after the owner is changed, in Exemplary Embodiment 2.

User A newly registers path information of each of electronic device 420 and relay 310 and time information (T6), in the procedure indicated by step S4000. In this case, server 200 deletes the registered path information associated with the relay of which the owner is changed. Here, the registration of path information of each of electronic device 420 and relay 310 by user B is deleted by server 200.

Figure 5:
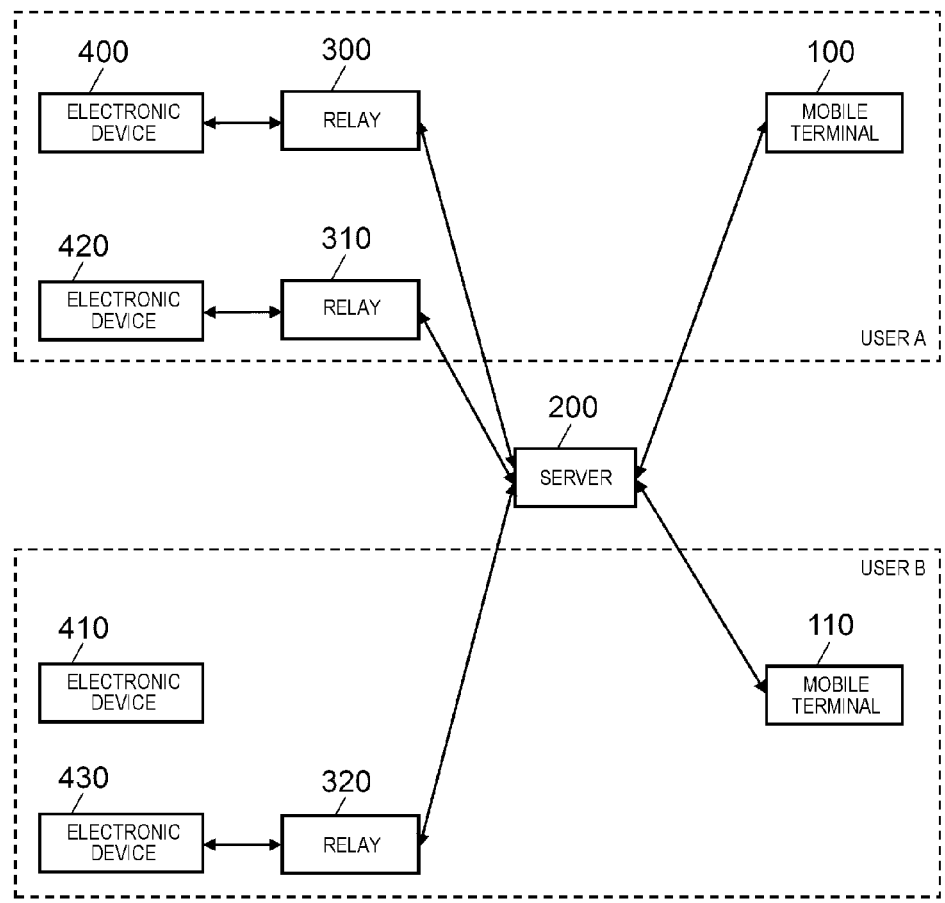
FIG. 5 is a configuration diagram illustrating the entire system after the owner of an electronic device and a relay is changed from user B to user A, in Exemplary Embodiment 2.

FIG. 5 illustrates the entire system after the owner of electronic device 420 and relay 310 is changed from user B to user A, in Exemplary Embodiment 2.

Thereafter, server 200 acquires the service information of electronic device 420 and time information (T7), according to the flow of step S4010 and step S4020. FIG. 16 is a diagram illustrating service information acquired after the owner is changed, in Exemplary Embodiment 2.

It is assumed that server 200 receives the user ID for identifying user A and a request for sensor information viewing of electronic device 420, from terminal 100. Server 200 compares the path information and time information of user A, which are registered in step S4000, with the path information and time information acquired in step S4010 (step S4030).

Since the time information T7 of the service information for which the path information pieces are consistent with each other is later than T6, the sensor information of time T7 is transmitted to terminal 100 (step S4040). In this case, with respect to the service information, if the path information pieces are consistent with each other but the time information is earlier than time T6, the service information is not transmitted.

As described above, according to Exemplary Embodiment 2, it is possible to provide sensor information which is acquired in a path matching the set information of the device ID and the relay ID, which are registered, and is acquired later than the time information at the time of registration, to the user. Thus, it is possible to provide only information from after the owner is changed, without providing information on the owner before the change to the owner after the change, even when the electronic device and the relay are changed together.

(Exemplary Embodiment 3)

Figure 6A:
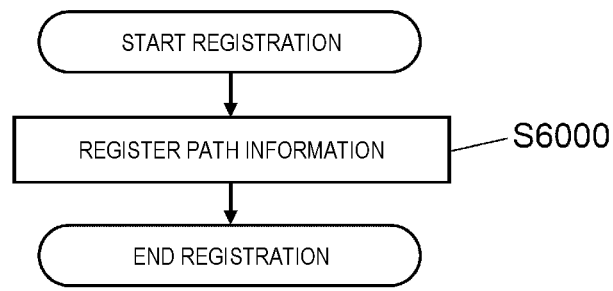
FIG. 6A is a flowchart illustrating the operation of a server to register a user ID and path information, in Exemplary Embodiment 3.

FIG. 6A is a flowchart illustrating the operation of the server to register a user ID and path information in Exemplary Embodiment 3. The configuration of the system is the same as in Exemplary Embodiment 1 (FIG. 1). With respect to the same configurations and steps as in Exemplary Embodiments 1 and 2, descriptions thereof will be omitted.

First, the operation of the registration step of service will be described in the case of registering relay 300 and electronic device 400 that user A owns.

Server 200 receives a device ID of electronic device 400, a relay ID of relay 300, and a pass code of electronic device 400 from terminal 100, registers the device ID, the relay ID, and the pass code in association with each other, and transmits the pass code to electronic device 400 (step S6000). The device ID, the relay ID, and the pass code are specified, for example, by the terminal 100 receiving an input by user A.

Here, the pass code is used for authentication when server 200 communicates with electronic device 400, and is determined by the user.

Similarly, server 200 receives the user ID for identifying user B, path information indicating the connection of electronic devices 410, and 420 to relay 310, and a pass code, from terminal 110, and registers the user ID, the path information, and the pass code in association with each other. Further, server 200 receives the user ID for identifying user B, path information indicating the connection of electronic device 430 to relay 320, and a pass code, from terminal 110, and registers the user ID, the path information, and the pass code in association with each other.

FIG. 17 is a diagram illustrating a user ID, path information, and a pass code, which are registered, in Exemplary Embodiment 3.

Figure 6B:
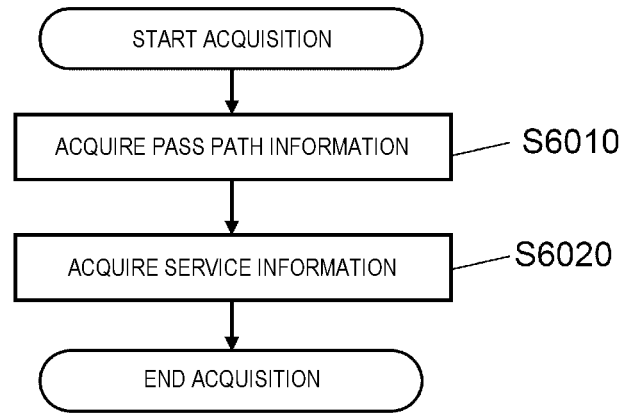
FIG. 6B is a flowchart illustrating the operation of the server to acquire service information, in Exemplary Embodiment 3.

FIG. 6B is a flowchart illustrating the operation of the server to acquire service information in Exemplary Embodiment 3.

Next, the operation of the service information acquisition step will be described as the case where server 200 acquires the service information from electronic device 400.

FIG. 18 illustrates service information and a pass code which are received and acquired from electronic device 400 by server 200 in Exemplary Embodiment 3.

If receiving the service information, server 200 extracts the device ID of electronic device 400 and the relay ID of relay 300 so as to acquire information on a path through which the service information has been transmitted (step 6010). Server 200 extracts the sensor information and the pass code that electronic device 400 has transmitted, from the received service information. Then, server 200 registers the sensor information, the device ID, the relay ID, and the pass code of electronic device 400 in association with each other, which are acquired in step 6010 (step S6020).

The same is applied to the case of acquiring service information from electronic devices 410, 420, and 430.

Next, the operation of the service information providing step will be described as the case where server 200 provides the service information from electronic device 400, to the user.

Figure 6C:
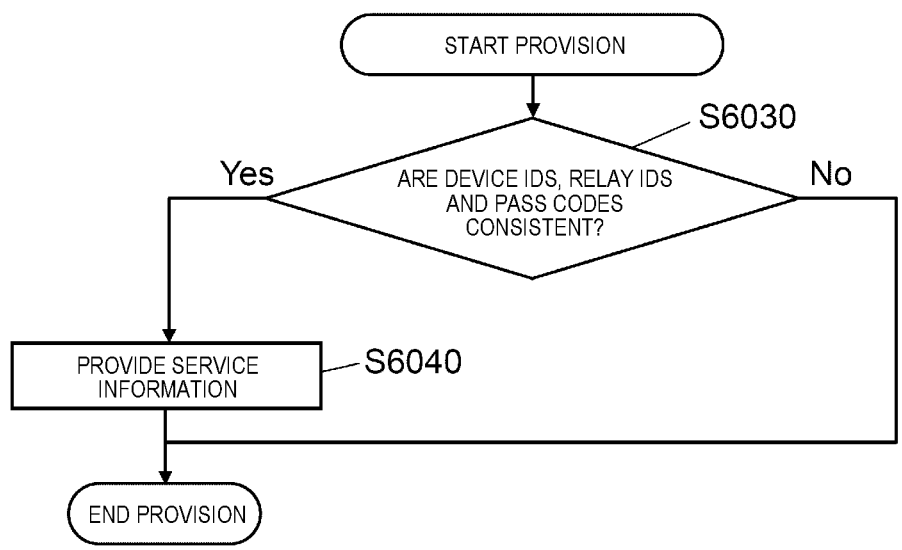
FIG. 6C is a flowchart illustrating the operation of the server to provide service information, in Exemplary Embodiment 3.

FIG. 6C is a flowchart illustrating the operation of the server to provide service information, in Exemplary Embodiment 3.

It is assumed that server 200 receives the user ID for identifying user A and a request for sensor information viewing of electronic device 400, from terminal 100. Server 200 compares the set information of the device ID and the relay ID acquired in step S6010 with the set information of the device ID and the relay ID registered in step S6000, and compares the pass code acquired in step S6020 with the pass code registered in step S6000 (step S6030).

In other words, the device ID acquired in step S6010 and the device ID registered in step S6000 are compared in step S6030. Further, the relay ID acquired in step S6010 and the relay ID registered in step S6000 are compared in step S6030. Further, the pass code acquired in step S6020 and the pass code registered in step S6000 are compared with each other.

As a comparison result, if the path information pieces, in other words, set information pieces of the device ID and the relay ID are consistent with each other, and the pass code at the time of registration and the pass code at the time of acquisition match, server 200 transmits the sensor information associated with the set information to terminal 100 (step S6040).

The same is applied to the case when user B views the service information from electronic device 410, and the case when user B views the service information from electronic device 420, using terminal 110.

Here, for example, it is assumed that the owner of electronic device 420 and relay 310 is changed from user B to user A. FIG. 19 is a diagram illustrating a user ID, path information, and a pass code, which are registered after the owner is changed, in Exemplary Embodiment 3. User A registers path information and the pass code of each of electronic device 420 and relay 310, in the procedure indicated by step S6000.

The entire system after the owner of electronic device 420 is changed from user B to user A is the same as in FIG. 3.

Thereafter, server 200 acquires the service information of electronic device 420 and the pass code, according to the flows of step S6010 and step S6020. FIG. 20 illustrates the service information and a pass code, which are registered after the owner is changed, in Exemplary Embodiment 3.

It is assumed that server 200 receives the user ID for identifying user A and a request for sensor information viewing of electronic device 420, from terminal 100. Server 200 compares the path information and the pass code which are registered in step S6000, with the path information and the pass code which are acquired in step S6020 (step S6030).

As a comparison result, server 200 transmits sensor information for which the path information pieces, in other words, the device IDs and the relay IDs, and the pass codes are consistent with each other, to terminal 100 (step S6040). If the path information pieces are not consistent with each other, or if the path information pieces are consistent with each other but the pass codes are not consistent with each other, server 200 does not transmit the sensor information to terminal 100. In this case, the sensor information illustrated in FIG. 20 is transmitted to terminal 100 and is provided to user A.

Meanwhile, the same is applied to the case where the user ID for identifying user B and a request for sensor information viewing of electronic device 420 are received from terminal 110, but when comparing the pass codes in step S6030, the pass code registered by user B and the pass code acquired in step S6020 are not consistent with each other. Therefore, the sensor information illustrated in FIG. 20 is not transmitted to terminal 110 and is not provided to user B.

In addition, the case of comparing the pass code of the electronic device at the time of registration with the pass code of the electronic device at the time of acquisition is described in Exemplary Embodiment 3, and the passwords of the electronic device are not compared, but the passwords of the relay may be compared with each other. Further, with respect to the pass code of the electronic device and the pass code of the relay, the pass code at the time of registration and the pass code at the time of acquisition may be compared with each other. The same is also applied to other exemplary embodiments.

As described above, according to Exemplary Embodiment 3, it is possible to provide sensor information which is acquired in a path matching the set information of the device ID and the relay ID, which are registered, and for which the pass code at the time of registration and the pass code at the time of acquisition are consistent with each other. Thus, the information on the owner before the change is protected from being provided to the owner after the change, and only information from after the owner is changed is provided, by the owner after the change changing the pass code, even when the electronic device and the relay are changed together.

(Exemplary Embodiment 4)

Figure 7A:
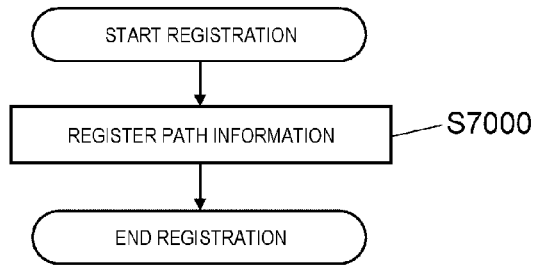
FIG. 7A is a flowchart illustrating the operation of a server to register a user ID and path information, in Exemplary Embodiment 4.

FIG. 7A is a flowchart illustrating the operation of the server to register a user ID and path information in Exemplary Embodiment 4. The configuration of the system is the same as in Exemplary Embodiment 1 (FIG. 1). With respect to the same configurations and steps as in Exemplary Embodiments 1 to 3, descriptions thereof will be omitted.

First, the operation of the registration step of service will be described in the case of registering relay 300 and electronic device 400 that user A owns.

Server 200 receives path information indicating the connection of electronic device 400 to relay 300, and a user ID from terminal 100. Server 200 registers the path information, the user ID, and time information (T1) about a time when the path information is received, in association with each other (step S7000).

FIG. 21 is a diagram illustrating a user ID, path information, and time information, which are registered, in Exemplary Embodiment 4. The same is applied to the case of connecting electronic devices 410 and 420 to relay 310, and the case of connecting electronic device 430 to relay 320. The time information pieces when electronic devices 410, 420, and 430 are registered are respectively assumed as T2, T3, and T4.

Figure 7B:
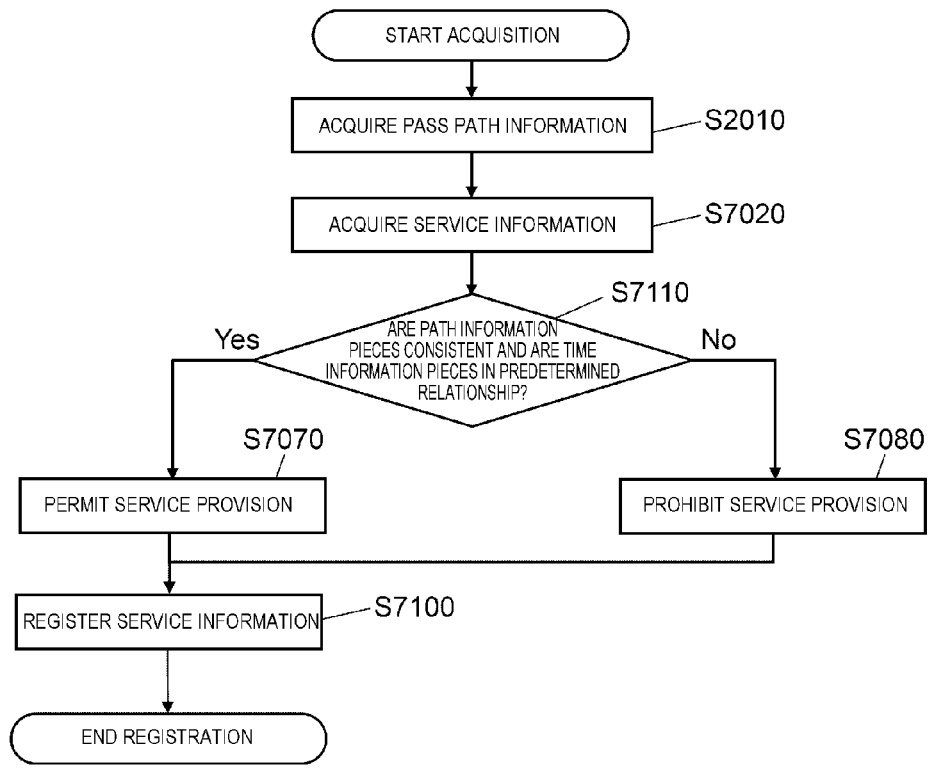
FIG. 7B is a flowchart illustrating the operation of the server to acquire service information, in Exemplary Embodiment 4.

FIG. 7B is a flowchart illustrating the operation of the server to acquire service information in Exemplary Embodiment 4.

The operation in the service information acquisition step will be described as the case where server 200 acquires the service information from electronic device 400.

Server 200 extracts the sensor information that electronic device 400 has transmitted, from the received service information. At this time, the path information acquired in step S2010 and time information when receiving the sensor information are associated with each other (step S7020). The same is also applied to the case of acquiring the service information from electronic devices 410 to 430.

FIG. 22 is a diagram illustrating the acquired service information, in Exemplary Embodiment 4. Here, the service information includes sensor information, path information, and time information.

Server 200 compares the path information registered in step S7000 with the path information acquired in step S2010, and compares the time information (T1) registered in step S7000 with the time information (T5) which is time received in step S7020 (step S7110).

In other words, the path information registered in step S7000 is compared with the path information acquired in step S2010, in step S7110. The time information (T1) registered in step S7000 is compared with the time information (T5) which is reception time of service information in step S7110.

As a comparison result, if the path information pieces are consistent with each other, and T5 is later than T1, server 200 permits the provision of sensor information to the user registered in step S7000 (step S7070). Meanwhile, as a comparison result, if the path information pieces are not consistent with each other, and T5 is earlier than T1, server 200 prohibits the provision of sensor information to the user registered in step S7000 (step S7080).

Server 200 registers the path information acquired in step S2010, the sensor information acquired in step S7020, and the propriety (permission or prohibition) of provision of the sensor information (step S7100), in association with each other.

Next, the operation of the service information providing step will be described as the case where server 200 provides the service information from electronic device 400, to user A.

Figure 7C:
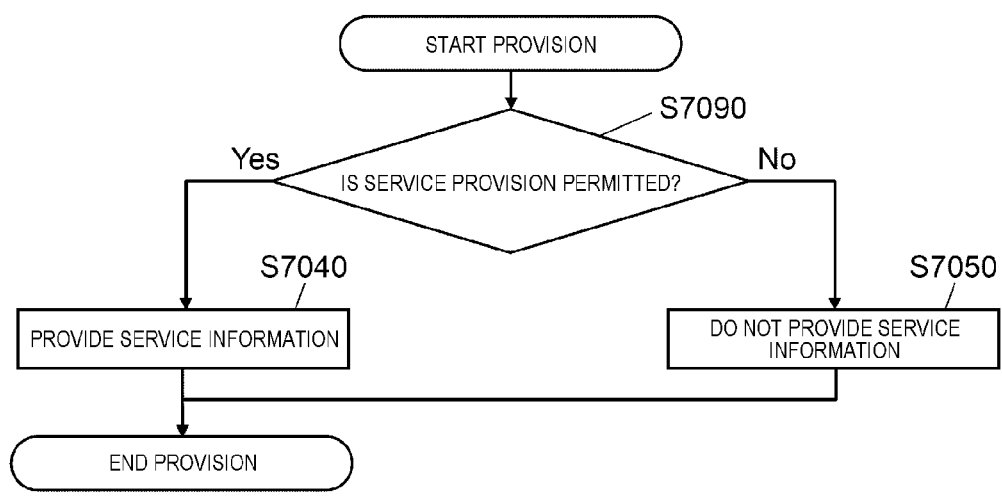
FIG. 7C is a flowchart illustrating the operation of the server to provide service information, in Exemplary Embodiment 4.

FIG. 7C is a flowchart illustrating the operation of the server to provide service information, in Exemplary Embodiment 4.

When receiving a request for sensor information viewing from terminal 100 by the user, server 200 determines whether or not the provision of the sensor information is permitted (step S7090). In other words, in step S7090, it is determined whether or not sensor information provision is permitted.

As a result of determination, if provision is permitted, server 200 transmits the sensor information to terminal 100 (step S7040). As a result of determination, if provision is prohibited, server 200 does not transmit the sensor information to terminal 100 (step S7050).

Here, it is assumed that the owner of electronic device 420 and relay 310 is changed from user B to user A. After the owner of electronic device 420 and relay 310 has been changed from user B to user A, the entire system is the same as that of FIG. 5.

User A registers the path information of electronic device 420 and relay 310 and time information (T10), in a procedure illustrated in step S7000. In this case, the registration of the path information of electronic device 420 and relay 310 by user B is deleted.

FIG. 23 is a diagram illustrating a user ID, path information, and time information, which are registered after the owner is changed, in Exemplary Embodiment 4.

FIG. 24 illustrates service information acquired before and after the owner is changed, in Exemplary Embodiment 4. The service information includes sensor information, path information, and time information. Here, time information T6 to T9 is information about time when acquiring sensor information about electronic devices 400 to 430, and is information about time before the owner of electronic device 420 and relay 310 is changed to user A. Time information T11 is information about time when acquiring sensor information about electronic device 420, and is information about time after the owner of electronic device 420 and relay 310 is changed to user A.

Server 200 determines the propriety of provision of the acquired sensor information to each user (steps S7110, S7070, and S7080). Server 200 registers the service information and the determination result as to the propriety of provision (step S7100).

FIG. 25 illustrates each piece of sensor information for each user and the propriety of provision of the sensor information for each user, in Exemplary Embodiment 4. Incidentally, "1" represents permission and "0" represents prohibition, in the item of service provision propriety in FIG. 25.

A description will be made regarding a case where there is a request for service information viewing of electronic device 420 from user A using terminal 100. Here, it is assumed that server 200 has sensor information of electronic device 420 including information acquired at time T8 and information acquired at time T11 later than time T10. Incidentally, the time T11 is the time after a predetermined time elapses from the time T10. However, since the provision of only information on time T11 for user A is permitted, server 200 transmits the sensor information acquired at time T11 to terminal 100 and does not transmit the sensor information acquired at time T8 to terminal 100.

Meanwhile, when there is a request for service information viewing of electronic device 420 from user B using terminal 110, since the provision of sensor information on time T8 for user B is permitted, server 200 transmits the sensor information acquired at time T8 to terminal 110. Server 200 does not transmit the sensor information acquired at time T11 to terminal 110.

In addition, in Exemplary Embodiment 4, the flows of steps S7110, S7070, and S7080 are executed after the step S7020 at the time of acquisition of the service information, but may be executed after the step S7000 of the service registration step. In this case, in the same manner as in Exemplary Embodiment 2, when acquiring the service information, it is assumed that the user ID, the path information through which the service information has been acquired, and the acquired time information are registered.

As described above, according to Exemplary Embodiment 4, the determination as to the propriety of service provision is performed when registering the sensor information, and the propriety determination result and the service information are registered. Thus, the sensor information received after the owner is changed can be prevented from being provided to the user other than the owner after the change. In addition, the sensor information received before the owner is changed can be prevented from being provided to the user other than the owner before the change.

(Exemplary Embodiment 5)

Figure 8A:
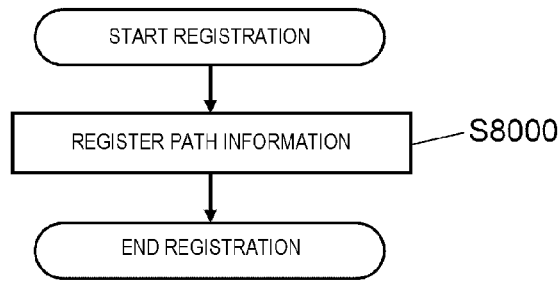
FIG. 8A is a flowchart illustrating the operation of a server to acquire a user ID and path information, in Exemplary Embodiment 5.

FIG. 8A is a flowchart illustrating the operation of the server to acquire a user ID and path information in Exemplary Embodiment 5. The configuration of the system is the same as in Exemplary Embodiment 1 (FIG. 1). With respect to the same configurations and steps as in Exemplary Embodiments 1 to 4, descriptions thereof will be omitted.

First, the operation of the registration step of service will be described in the case of registering relay 300 and electronic device 400 that user A owns.

Server 200 receives path information indicating the connection of electronic device 400 to relay 300, and a pass code of relay 300, registers the path information, and the pass code in association with each other, and transmits the pass code to relay 300 (step S8000).

The same is applied to the case where user B connects electronic devices 410, and 420 to relay 310, and the case where user B connects electronic device 430 to relay 320, using terminal 110.

FIG. 26 illustrates the examples of the user ID, the path information, and the pass code, which are registered.

Figure 8B:
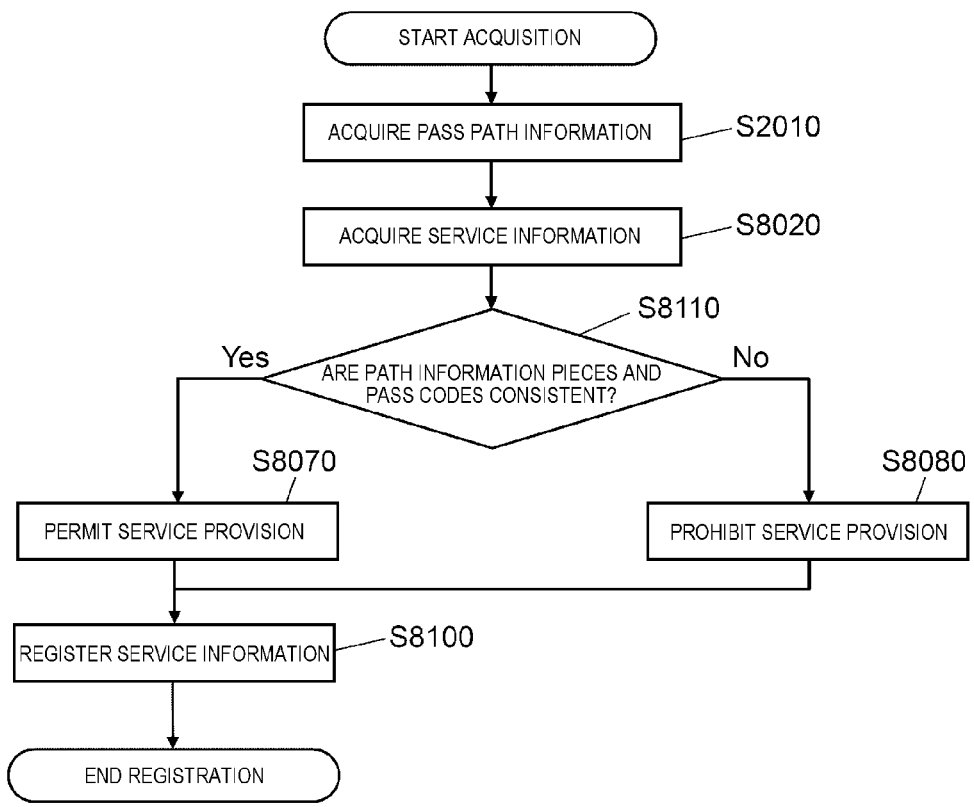
FIG. 8B is a flowchart illustrating the operation of the server to acquire service information, in Exemplary Embodiment 5.

FIG. 8B is a flowchart illustrating the operation of the server to acquire service information in Exemplary Embodiment 5.

The operation in the service information acquisition step will be described as the case where server 200 acquires the service information from electronic device 400.

Server 200 extracts the sensor information that electronic device 400 has transmitted, from the received service information. At this time, the path information acquired in step S2010 and the pass code of relay 300 are associated (step S8020). The same is also applied to the case of acquiring the service information from electronic devices 410 to 430.

FIG. 27 illustrates the service information and the pass code which are received and acquired from electronic device 400 by server 200.

Server 200 compares the path information registered in step S8000 with the path information acquired in step S2010, and compares the pass code of relay 300 registered in step S8000 with the pass code of relay 300 which is extracted from the service information acquired in step S8020 (step S8110).

In other words, the path information registered in step S8000 is compared with the path information acquired in step S2010, in step S8110. In addition, the pass code of relay 300 registered in step S8000 is compared with the pass code of relay 300 which is extracted from the service information acquired in step S8020, in step S8110.

As a comparison result, if the path information pieces are consistent with each other and the pass codes of relay 300 are also consistent with each other, server 200 permits the provision of sensor information to the user registered in step S8000 (step S8070). Meanwhile, as a comparison result, if the path information pieces are not consistent with each other and the pass codes of relay 300 are also not consistent with each other, server 200 prohibits the provision of the sensor information to the user registered in step S8000 (step S8080). Server 200 registers the path information acquired in step S210, the sensor information acquired in step S8020, and the propriety (permission or prohibition) of provision of the sensor information (step S8100), in association with each other.

The provision of the service information is the same as that of Exemplary Embodiment 4.

Here, it is assumed that the owner of electronic device 420 and relay 310 is changed from user B to user A. After the owner of electronic device 420 has been changed from user B to user A, the entire system is the same as that of FIG. 5.

User A registers the path information of electronic device 420 and relay 310 and the pass code of relay 310, in a procedure illustrated in step S8000.

FIG. 28 illustrates a user ID, path information, and a pass code, which are registered after the owner is changed, in Exemplary Embodiment 5. FIG. 29 illustrates service information and a pass code acquired before and after the change of the owner of the electronic device, in Exemplary Embodiment 5.

Server 200 determines the propriety of provision of the acquired sensor information for each user (steps S8110, S8070, and S8080). Server 200 registers the service information and the determination result (step S8100).

FIG. 30 illustrates sensor information for each user and the propriety of provision of the sensor information for each user, in Exemplary Embodiment 5. Incidentally, "1" represents permission and "0" represents prohibition, in the item of service provision propriety in FIG. 30.

A description will be made regarding a case where there is a request for service information viewing of electronic device 420 from user A using terminal 100. Server 200 has two pieces of sensor information of electronic device 420, in other words, the sensor information acquired when the owner of electronic device 420 is B (before the change) (hereinafter, referred to as sensor information from before the change), and the sensor information acquired when the owner of electronic device 420 is changed from B to A (after the change) (hereinafter, referred to as sensor information from after the change). Since the provision of the sensor information from after the change is permitted for user A, server 200 transmits the sensor information from after the change to terminal 100. Since the provision of the sensor information from before the change is prohibited for user A, server 200 does not transmit the sensor information from before the change to terminal 100.

Meanwhile, a description will be made regarding a case where there is a request for service information viewing of electronic device 420 from user B using terminal 110. Since the provision of the sensor information from before the change is permitted for user B, server 200 transmits the sensor information from before the change to terminal 110. Since the provision of the sensor information from after the change is prohibited for user B, server 200 does not transmit the sensor information from after the change to terminal 100.

In addition, in Exemplary Embodiment 5, pass codes of relay 300 are compared with each other. The pass codes of relay 300 are not compared, but the pass codes of electronic device 400 may be compared with each other. With respect to both the pass codes of electronic device 400 and the pass codes of relay 300, the pass codes at the time of registration and the pass codes at the time of acquisition may be compared with each other.

In addition, in Exemplary Embodiment 5, the flows of steps S8110, S8070, and S8080 are executed after step S8020 at the time of acquisition of the service information, but the flows may be executed after step S8000 of the service registration step. In this case, similar to Exemplary Embodiment 3, it is assumed that the user ID, the path information through which the service information has been acquired, and the pass code are registered, when acquiring the service information.

As described above, according to Exemplary Embodiment 5, the determination as to the propriety of service provision is performed when registering the sensor information. Thus, the sensor information received after the owner is changed is not provided to the users other than the owner after the change, by the owner after the change changing the pass code. Further, the sensor information received before the owner is changed is not provided to the users other than the owner before the change.

As described above, the service providing method according to each exemplary embodiment of the present invention is a service providing method using server 200 that controls electronic devices 400, 410, 420, and 430 from terminals 100 and 110 through a network. The service providing method includes a first registration step of registering first path information indicating connection relationships between electronic devices 400, 410, 420, and 430, and relays 300, 310, and 320 which relay the communication with electronic devices 400, 410, 420, and 430, and user information indicating the owners of electronic devices 400, 410, 420, and 430, which are transmitted from terminals 100 and 110, in association with each other. Further, the service providing method includes a path acquisition step of acquiring second path information indicating the connection relationship between electronic devices 400, 410, 420, and 430 and relays 300, 310, and 320, from the service information transmitted from electronic devices 400, 410, 420, and 430. Further, the service providing method includes a service information acquisition step of acquiring the service information that electronic devices 400, 410, 420, and 430 hold, and a comparison step of comparing the first path information that is registered in the first registration step with the second path information that is acquired in the path acquisition step. In addition, the service providing method includes a providing step of providing the service information to terminals 100 and 110, if a result of the comparison in the comparison step indicates that the first path information matches the second path information.

Further, the first path information and the second path information may include a device identifier for identifying each of electronic devices 400, 410, 420, and 430 and a relay identifier for identifying each of relays 300, 310, and 320.

Further, the service information may be a value acquired from the sensor included in each of electronic devices 400, 410, 420, and 430.

Further, in the first registration step, time information at the time of execution of the first registration step may be further acquired, and the first path information, the user information, and the time information at the time of execution of the first registration step may be registered in the server in association with each other. Further, in the service information acquisition step, time information at a time of acquisition of the service information may be further acquired, and the service information, the second path information, and the time information at the time of acquisition of the service information may be registered in the server in association with each other. Further, in the comparison step, the time information which is registered in the first registration step and the time information which is acquired in the service information acquisition step may be compared with each other.

Further, in the first registration step, the pass codes of electronic devices 400, 410, 420, and 430, which are received from terminals 100 and 110, may be registered in the server in association with the path information and the user information. Further, in the comparison step, the pass codes of electronic devices 400, 410, 420, and 430, which are registered in the first registration step and the pass codes which are received from terminals 100 and 110 may be compared with each other.

Further, in the first registration step, the pass codes of relays 300, 310, and 320, which are received from terminals 100 and 110, may be registered in server 200 in association with the path information and the user information.

Further, in the comparison step, the pass codes of relays 300, 310, and 320, which are registered in the first registration step and the pass codes which are received from terminals 100 and 110 may be compared with each other.

Further, in the first registration step, the time information at the time of execution of the first registration step may be registered in association therewith.

Further, in the first registration step, a pass codes of electronic devices 400, 410, 420, and 430, which are received from terminals 100 and 110, may be registered in server 200.

Further, in the first registration step, the pass codes of relays 300, 310, and 320, which are received from terminals 100 and 110 may be registered in server 200.

Further, the first path acquisition step and the comparison step are executed whenever the first registration step is executed, and if a comparison result is inconsistent in the comparison step, all pieces of the service information may not be provided to terminals 100 and 110.

Further, the first path acquisition step and the comparison step are executed whenever the first registration step is executed, and if the comparison result is inconsistent in the comparison step, the service information after the first registration step is executed may not be provided to terminals 100 and 110.

Further, the service information acquisition step may include a second registration step of registering the path information acquired by executing the path acquisition step in association therewith.

Further, the comparison step may be executed at a time of execution of the second registration step.

INDUSTRIAL APPLICABILITY

As described above, according to the service providing method, it is possible to achieve a particular effect that, when the electronic device is changed, it is possible to prevent the service information that is acquired before the change from being provided to the owner after the change, and to prevent the service information that is acquired after the change from being provided to the owner before the change. Thus, the service providing method according to the present invention can be applied to a network home appliance, or the like that acquires the information on home appliances connected to a network, from a terminal including a smartphone.

REFERENCE SIGN LIST 100, 110 terminal
200 server 300, 310, 320 relay
400, 410, 420, 430 electronic device

The invention claimed is:

1. A service providing method using a server that controls an electronic device from a terminal through a network, the method comprising the server performing:
   a first registration step of registering first path information indicating a device connection relationship between the electronic device and a remote relay device which relays communication data with the electronic device to the server, wherein the first path information and the second path information include a device identifier for identifying the electronic device and a relay identifier for identifying the relay device, wherein in the first registration step, time information at the time of execution of the first registration step is further acquired, and the first path information, the user information, and the time information at the time of execution of the first registration step are registered in association with each other, and user information indicating an owner of the electronic device, which are transmitted from the terminal to the server, in association with each other;
   a path acquisition step of acquiring second path information indicating the device connection relationship between the electronic device and the relay device, from service information transmitted from the electronic device;
   a service information acquisition step of acquiring service information that the electronic device holds, wherein in the service information acquisition step, time information at a time of acquisition of the service information is further acquired, and the service information, the second path information, and the time information at the time of acquisition of the service information are registered in association with each other;
   a comparison step of comparing the first path information that is registered in the first registration step with the second path information that is acquired in the path acquisition step, wherein in the comparison step, the time information which is registered in the first registration step and the time information which is registered in the service information acquisition step are compared with each other; and
   a providing step of providing the service information to the terminal, if a result of the comparison in the comparison step is consistent.

2. The service providing method of claim 1,
wherein the service information is a value acquired from a sensor included in the electronic device.

3. The service providing method of claim 1,
wherein in the first registration step, a pass code of the electronic device, which is received from the terminal, is registered in the server in association with the first path information and the user information, and
wherein in the comparison step, the pass code of the electronic device which is registered in the first registration step and the pass code which is received from the terminal are compared with each other.

4. The service providing method of claim 1,
wherein in the first registration step, a pass code of the relay device, which is received from the terminal, is registered in the server in association with the first path information and the user information, and
wherein in the comparison step, the pass code of the relay device which is registered in the first registration step and the pass code which is received from the terminal are compared with each other.

5. The service providing method of claim 2,
wherein in the first registration step, the time information at the time of execution of the first registration step is registered in association therewith.

6. The service providing method of claim 2,
wherein in the first registration step, a pass code of the electronic device, which is received from the terminal, is registered in the server.

7. The service providing method of claim 2,
wherein in the first registration step, a pass code of the relay device, which is received from the terminal, is registered in the server.

8. The service providing method of claim 5,
wherein the first path acquisition step and the comparison step are executed whenever the first registration step is executed, and
wherein if the comparison result is inconsistent in the comparison step, all pieces of the service information are not provided to the terminal.

9. The service providing method of any of claim 5,
wherein the first path acquisition step and the comparison step are executed whenever the first registration step is executed, and
wherein if the comparison result is inconsistent in the comparison step, the service information after the first registration step is executed is not provided to the terminal.

10. The service providing method of claim 5,
wherein the service information acquisition step includes a second registration step of registering the path information acquired by executing the path acquisition step in association therewith.

11. The service providing method of claim 10,
wherein the comparison step is executed at a time of execution of the second registration step.

* * * * *